United States Patent [19]

McCurdy

[11] Patent Number: 4,991,498
[45] Date of Patent: Feb. 12, 1991

[54] LEAF BALER

[76] Inventor: Harold L. McCurdy, 408 E. Market, Panora, Iowa 50216

[21] Appl. No.: 465,436

[22] Filed: Jan. 16, 1990

[51] Int. Cl.$^5$ .......................... A01F 15/14; B30B 9/30; B65B 13/02
[52] U.S. Cl. .......................................... 100/8; 100/17; 100/18; 100/19 R; 100/24
[58] Field of Search ..................... 100/8, 17, 18, 19 R, 100/24

[56] References Cited

U.S. PATENT DOCUMENTS

| | | | |
|---|---|---|---|
| 351,104 | 10/1886 | Gallagher | 100/8 |
| 713,791 | 11/1902 | Orman | 100/24 |
| 778,446 | 12/1904 | Clark et al. | 100/8 |
| 3,827,349 | 8/1974 | Gilman | 100/8 |
| 3,911,519 | 10/1975 | Anlas et al. | 15/83 |
| 3,929,062 | 12/1975 | Thompson | 100/3 |
| 3,999,476 | 12/1976 | Thompson | 100/7 |

FOREIGN PATENT DOCUMENTS 318861  4/1920  Fed. Rep. of Germany ........ 100/24
3238642 4/1984 Fed. Rep. of Germany .......... 100/8

Primary Examiner—Paul T. Sewell
Assistant Examiner—M. D. Patterson
Attorney, Agent, or Firm—Henderson & Sturm

[57] ABSTRACT

A leaf baler including a compression chamber, a feed chamber, and a hydraulic ram being longitudinally aligned and mounted on a portable frame. The compression chamber includes an end wall and top and bottom walls that include pairs of communicating slots for receiving a flexible line, such as baling twine. A foot member is attached to the end of the hydraulic ram and is disposed to selectively extend through the open end of the compression chamber. The foot member also includes a pair of slots that communicate with the slots of the top and bottom walls when the foot member extends into the compression chamber. A needle including both a top and bottom notched eye is selectively received into the end wall slots and foot member slots to train and guide a pair of twine strings around a compressed bale to secure it before releasing it fromt he compression chamber.

8 Claims, 4 Drawing Sheets

LEAF BALER

DISCLOSURE OF THE INVENTION

The present invention provides a leaf baler including a compression chamber, a feed chamber, and a hydraulic ram being longitudinally aligned and mounted on a portable frame. The compression chamber includes an end wall and top and bottom walls that include pairs of communicating slots for receiving a flexible line, such as baling twine. A foot member is attached to the end of the hydraulic ram and is disposed to selectively extend through the open end of the compression chamber. The foot member also includes a pair of slots that communicate with the slots of the top and bottom walls when the foot member extends into the compression chamber. A needle including both a top and bottom notched eye is selectively received into the end wall slots and foot member slots to train and guide a pair of twine strings around a compressed bale to secure it before releasing it from the compression chamber.

An object of the present invention is the provision of an improved leaf baler.

Another object is to provide a leaf baler that is uncomplicated in design and easy to operate.

A further object of the invention is the provision of a leaf baler that is inexpensive to manufacture.

Still another object is to provide a leaf baler that is portable.

A still further object of the present invention is the provision of a leaf baler that is durable and inexpensive to maintain.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 7 is a partial rear perspective of the compression chamber illustrating the tension springs used to assist in opening the compression chamber; and FIG. 8 is a perspective view illustrating a method of forming a loop in one end of the twine to allow for leverage in tightening the twine while performing the tying operation.

BEST MODE FOR CARRYING OUT THE INVENTION

Figure 1:
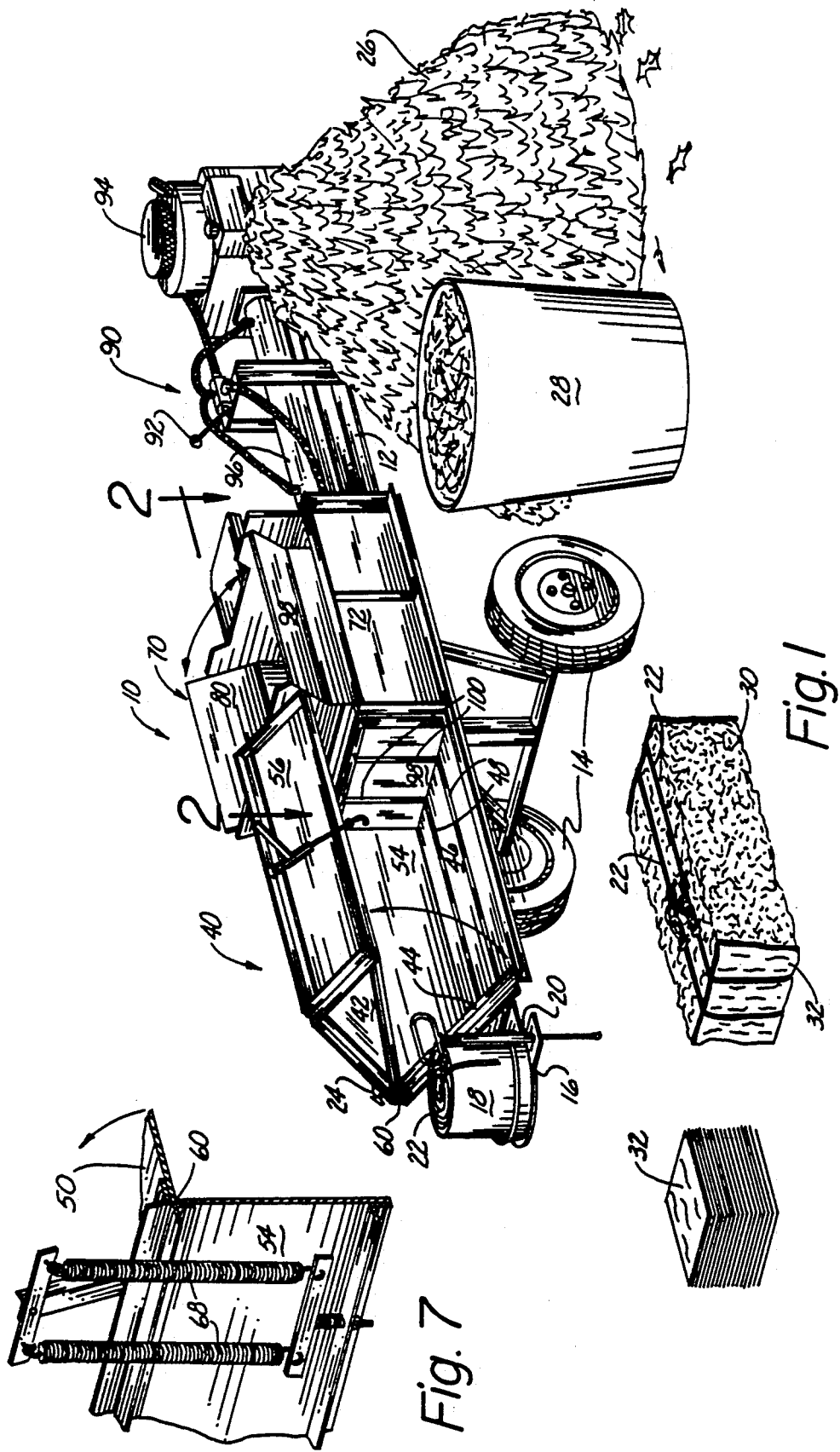
FIG. 1 is a perspective view of the leaf baler of the present invention illustrating a compressed bale released from the compression chamber.

Referring now to the drawings, wherein like reference numerals designate identical or corresponding parts throughout the several views, FIG. 1 shows the leaf baler (10) of the present invention. The baler (10) includes a frame (12) supported by ground wheels (14) which provide for portability to any convenient location. A compression chamber (40), a feed chamber (70) and a hydraulic ram system (90) are mounted at the frame (12) in longitudinal alignment. A bracket (16) supports a twine holder (18) and a needle holder (20). A supply of twine (22) is received in the holder (20) and is located in the vicinity of a twine cutter (24) attached to the compression chamber (40). FIG. 1 depicts a pile of leaves (26) and a drum (28) used to charge leaves into the feed chamber (70). A tied compressed bale (30) and a supply of cardboard squares (32) used as bale end supports are shown near the baler (10).

As best shown in FIGS. 1, 4, 6 and 7, the compression chamber (40) includes an end wall (42) with a pair of vertical slot recesses (44), a bottom wall (46) with a first pair of slot openings (48), a top wall (50) with a second pair of slot openings (52), a rear wall (54), a front wall (56), and an open end (58). A pivot hinge (60) interconnects the top wall (50) and the rear wall (54) to allow the compression chamber (40) to be selectively opened and closed. When closed, a latch (62) secures the front wall (56) adjacent the bottom wall (46) along a horizontal joint (64), and it secures the two sections of the end wall (42) adjacent each other along a diagonal joint (66). The diagonal end joint (66) provides the required strength when the compression chamber (40) is closed, and it allows easy removal of the compressed bale (30) once the compression chamber (40) is opened. Opening of the compression chamber (40) is facilitated by the springs (68) that interconnect the rear wall (54) and the top wall (50).

Figure 2:
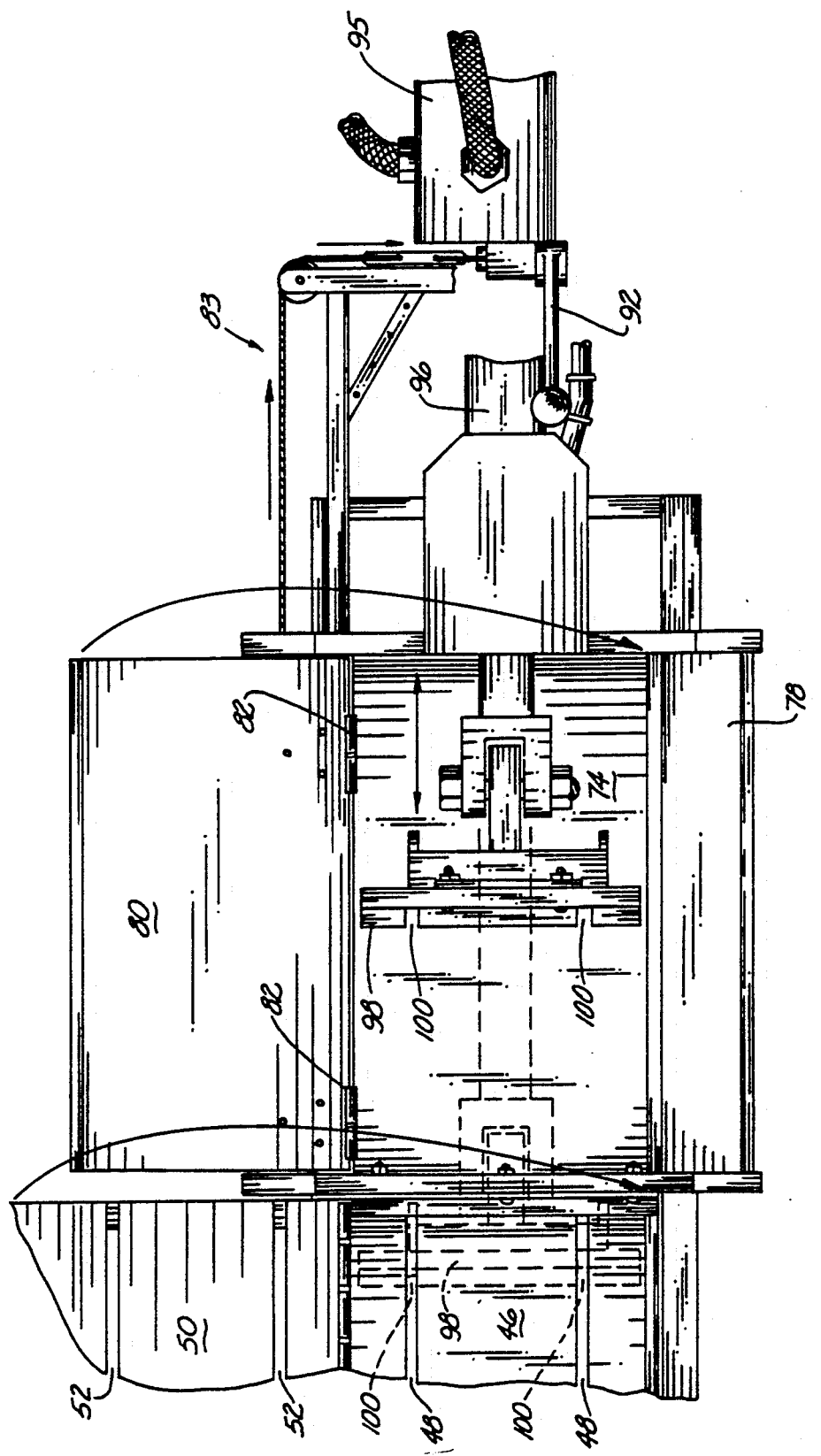
FIG. 2 is a partial top plan view taken along line 2—2 of FIG. 1 where the hydraulic cylinder is shown in a partially retracted position in full lines, and a partially extended position in dashed line.
Figure 3:
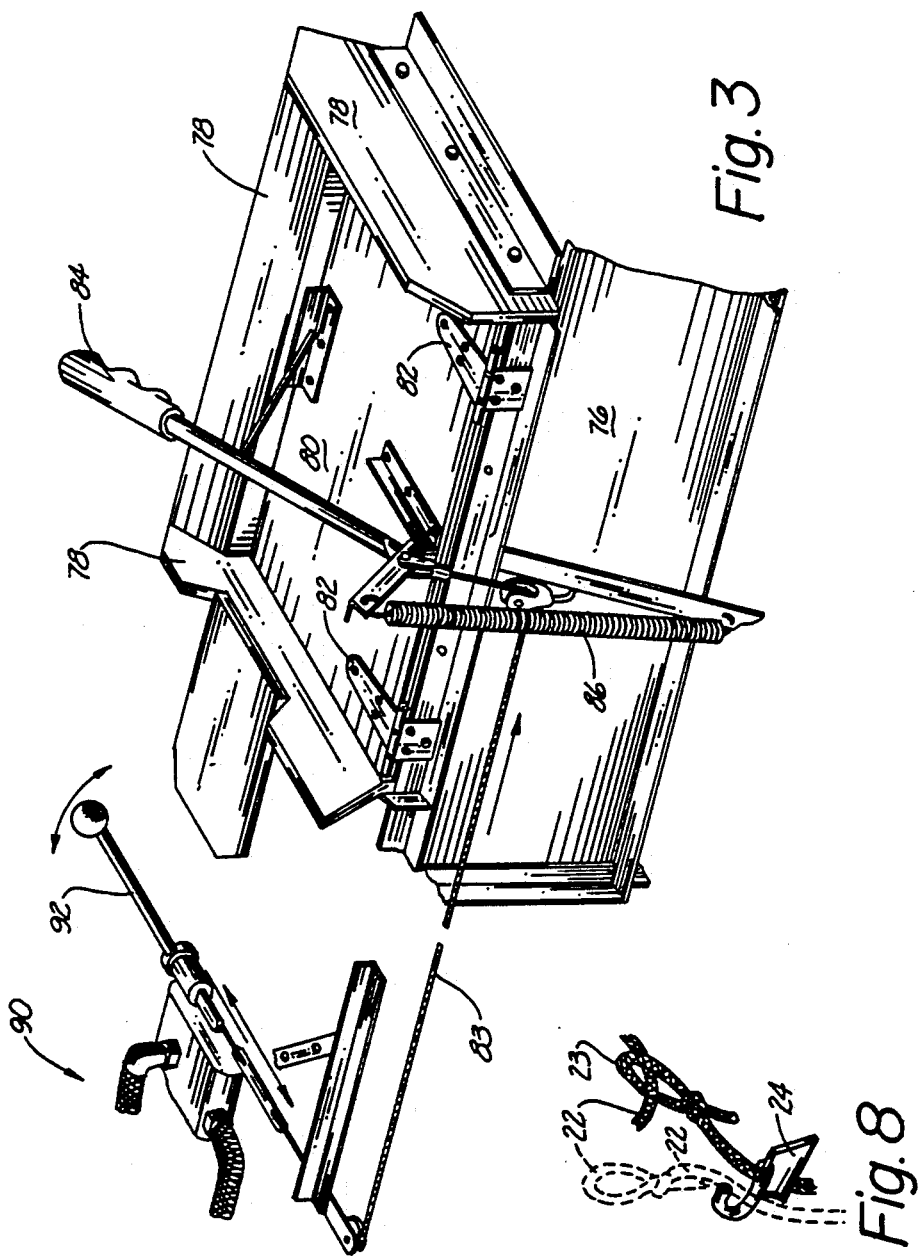
FIG. 3 is a partial rear perspective of the feed chamber showing the cylinder control mechanism attached to and controlled by the position of the top door.
Figure 4:
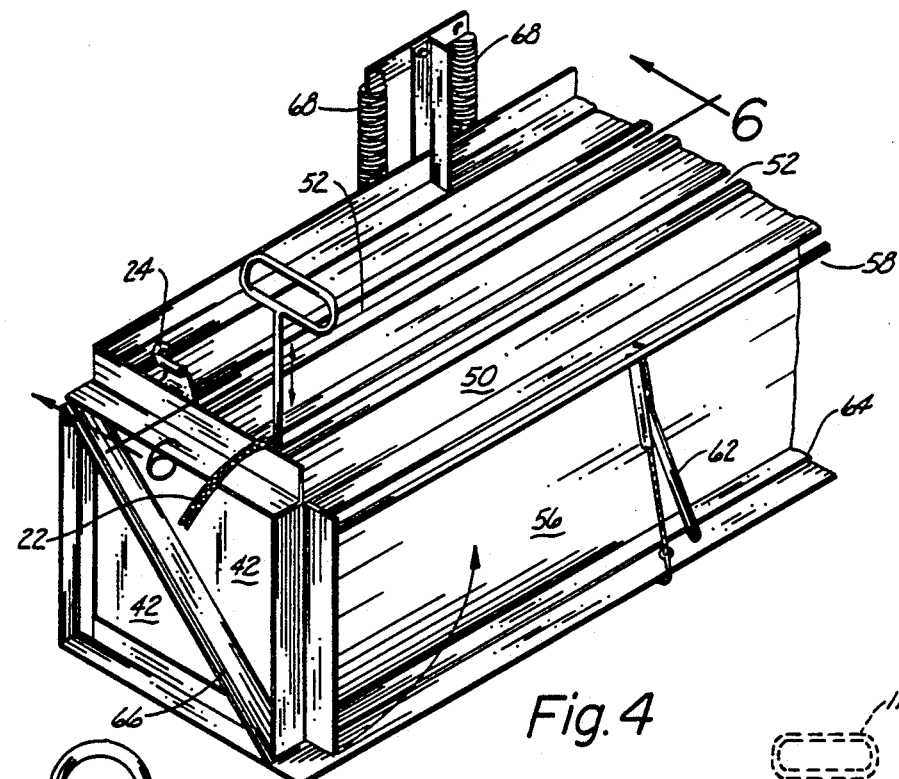
FIG. 4 is a partial front perspective view of the compression chamber illustrating a section of twine being inserted in one of the end wall slots by the needle.

As most clearly shown in FIGS. 1–3, the feed chamber (70) includes a front wall (72), a bottom wall (74) and a rear wall (76). A flared skirting (78) extends around the top of the feed chamber (70) and a selectively closable top door (80) is attached to the rear wall (76) by hinge (82). A cable controller (83) interconnects the top door (80) and the operating lever (92) of the hydraulic ram system (90). The door (80) carries a forwardly extending handle (84) that is accessible to the operator when feeding leaves into the feed chamber (70). A spring (86) interconnects the rear wall (76) and the top door (80) to assist the operator when opening the door (80). Only when the door (80) is closed will the cable controller (83) allow the operating lever (92) to move forward; otherwise, the lever (92) is held in a position that prevents the hydraulic ram system (90) from extending forward through the feed chamber (70) and into the compression chamber (40).

As shown in FIGS. 1 and 2, the hydraulic ram system (90) includes a gasoline engine (94) connected to a hydraulic pump (95) to power a reversible hydraulic cylinder (96). The cylinder (96) is movable between a retracted position and an extended position. The end of the cylinder (96) carries a foot member (98) which includes a pair of vertical slot recesses (100). The foot member slots (100) communicate with the slot openings (48, 52) when the foot member (98) extends into the compression chamber (40).

Figure 5:
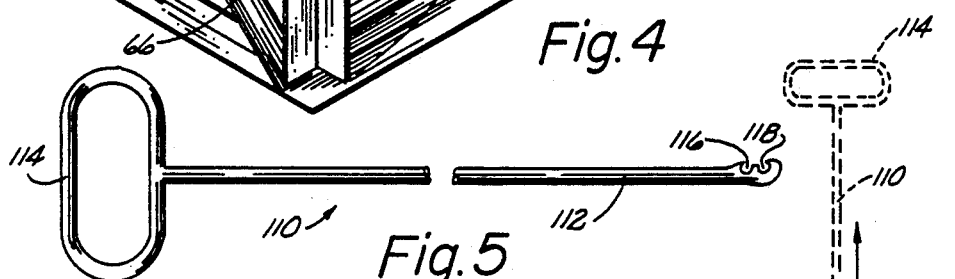
FIG. 5 is a side elevational view of the needle showing the oppositely directed eyes for alternatively pushing and pulling the twine through the end wall slots and foot member slots.
Figure 6:
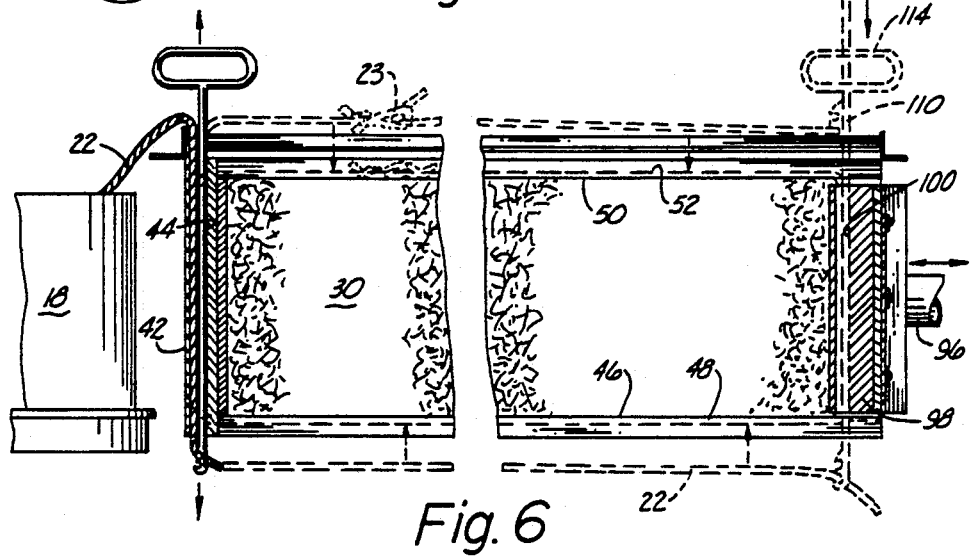
FIG. 6 is a side elevation sectional view taken along line 6—6 of FIG. 4 illustrating the path of the twine as it is trained around a compressed bale and tied to secure the bale before releasing the bale from the compression chamber.

The needle (110) used to train and guide the twine (22) through the end wall slots (44) and the foot member slots (100) is best shown in FIG. 5. The needle (110) includes an elongated shaft (112) having a handle (114) at one end. The opposite end carries a pair of opposing eye notches (116, 118) that receive and guide a section of twine (22) to respectively push and pull it through the end wall slots (44) and the foot member slots (100).

In operation, compressible materials, such as leaves (26) or grass clippings are charged to the feed chamber (70) and the door (80) is closed allowing operation of the lever (92). As the cylinder (96) and foot member (98) advance, the leaves (26) are compressed against the end wall (42). The cylinder (96) is retracted and the process is repeated until the compression chamber (40) is full of compacted material. With the foot member extended so that the foot member slots (100) communicate with the slot openings (46, 52), the twine (22) is positioned to engage the top eye (116) and is trained and pushed through one of the end wall slots (44) by the needle (110) as shown in the full line representation of FIG. 6. The twine (22) is then disengaged from the top eye (116) and directed to the other end of the compression chamber (40) along the corresponding one of the slot openings (48). The needle (110) is next extended down through the corresponding foot member slots (100) and the twine (22) is engaged by the bottom eye (118) and pulled up through the foot member slot (100) as illustrated by dashed lines. The twine (22) is then directed back along the corresponding slot opening (52). A loop (23) is then formed in the twine (22) and it is cut and tied as illustrated in FIG. 8. The process is then repeated to provide a pair of twine ties that extend around and secure the compressed bale (30).

It is to be understood that cardboard rectangles (32) can be used to provide semi-rigid ends for the compressed bales (30). Once both twines are tied, the latch (62) is released, the compressed bale (30) is removed, the compression chamber (40) is again closed, and the entire process repeated.

The compressed bales (30) thus formed typically weigh up to 25 kilograms and are formed from 5-7 large drums of leaves (26). The volume reduction achieved minimizes problems of transport and storage. The baled leaves can be used as mulch for gardens or used by farmers in large quantities on their fields. The cardboard ends (32) and the twine (22) will deteriorate over time and present no environmental pollution problems.

Thus, it can be seen that at least all of the stated objectives have been achieved.

Obviously, many modifications and variations of the present invention are possible in light of the above teachings. It is therefore to be understood that, within the scope of the appended claims, the invention may be practised otherwise than as specifically described.

I claim:

1. A leaf baler, comprising:
a frame;
a compression chamber mounted on said frame;
said compression chamber including:
an end wall having a pair of vertical slot recesses formed therein;
a bottom wall extending from said end wall and having a first pair of horizontal slot openings formed therein and disposed in communication with said end wall slots;
a top wall extending from said end wall and having a second pair of horizontal slot openings formed therein and disposed in communication with said end wall slot;
a rear wall attached to and disposed to interconnect said end wall, bottom wall, and top wall;
a front wall attached to and disposed to interconnect said end wall, bottom wall, and top wall; and
an open end disposed opposite said end wall and adapted to receive compressible materials;
a feed chamber mounted on said frame and being disposed in communication with the open end of said compression chamber, said feed chamber including a selectively closable top door pivotally attached to said feed chamber and being movable between a closed position and an open position;
a hydraulic cylinder mounted on said frame in longitudinal alignment with said compression chamber, said cylinder being selectively movable between a retracted and an extended position;
a foot member attached to said hydraulic cylinder and disposed to extend through said open end when said cylinder is in the extended position, said foot member having a pair of vertical slot recesses formed therein and disposed in communication with said first and second pairs of slot openings when said cylinder is in the extended position;
means for controlling said hydraulic cylinder wherein said cylinder is prevented from travelling between its retracted position and its extended position when said top door is in the open position;
means for training a flexible line through said end wall slots, first slot openings, and second slot openings and around said compressed bale to form a tied bale; and
means for releasing said tied bale from said compression chamber.

2. The baler of claim 1 wherein said means for training a flexible line includes:
a needle having an elongated shaft adapted to be selectively received in said end wall slots, said needle including a first notched eye formed at one end and a hand grip formed at the opposite end, said first eye being adapted to receive and guide a section of said flexible line through said end wall slots.

3. The baler of claim 1 wherein said means for training a flexible line includes:
a needle having an elongated shaft adapted to be selectively received in said end wall slots, said needle including a first notched eye formed at one end and a hand grip formed at the opposite end, said first eye being adapted to receive and guide a section of said flexible line through said end wall slots.

4. The baler of claim 3 wherein said needle further includes a second notched eye formed adjacent said first eye and being oppositely directed, said first eye being adapted to push a section of flexible line through said end wall slots, and said second eye being adapted to pull a section of flexible line through said foot member slots.

5. A leaf baler, comprising:
a frame;
a compression chamber mounted on said frame;
said compression chamber including:
an end wall having a pair of vertical slot recesses formed therein;

a bottom wall extending from said end wall and having a first pair of horizontal slot openings formed therein and disposed in communication with said end wall slots;

a top wall extending from said end wall and having a second pair of horizontal slot openings formed therein and disposed in communication with said end wall slot;

a rear wall attached to and disposed to interconnect said end wall, bottom wall, and top wall;

a front wall attached to and disposed to interconnect said end wall, bottom wall, and top wall; and an open end disposed opposite said end wall and adapted to receive compressible materials;

means for feeding compressible materials into said compression chamber through said open end;

a hydraulic cylinder mounted on said frame in longitudinal alignment with said compression chamber, said cylinder being selectively movable between a retracted and an extended position; and a foot member attached to said hydraulic cylinder and disposed to extend through said open end when said cylinder is in the extended position, said foot member having a pair of vertical slot recesses formed therein and disposed in communication with said first and second pairs of slot openings when said cylinder is in the extended position;

means for training a flexible line through said end wall slots, first slot openings, and second slot openings and around said compressed bale to form a tied bale; said means for training a flexible line including:

a needle having an elongated shaft adapted to be selectively received in said end wall slots, said needle including a first notched eye formed at one end and a hand grip formed at the opposite end, said first eye being adapted to receive and guide a section of sake flexible line through said end wall slots, and a second notched eye formed adjacent said first eye and being oppositely directed, said first eye being adapted to push a section of flexible line through said end wall slots, and said second eye being adapted to pull a section of flexible line through said foot member slots; and means for releasing said tied bale from said compression chamber.

6. The baler of claim 5 wherein said means for feeding compressible materials into said compression chamber includes a feed chamber mounted on said frame and being disposed in communication with the open end of said compression chamber.

7. The baler of claim 6 wherein said feed chamber includes a selectively closable top door pivotally attached to said feed chamber and being movable between a closed position and an open position.

8. The baler of claim 5 further including:

means for controlling said hydraulic cylinder wherein said cylinder is prevented from travelling between its retracted position and its extended position when said top door is in the open position.

* * * * *